(12) United States Patent
Bunker (10) Patent No.: US 6,197,358 B1
(45) Date of Patent: Mar. 6, 2001

(54) WATERLESS PROCESS AND SYSTEM FOR MAKING DEHYDRATED POTATO PRODUCTS

(75) Inventor: LaRue Bunker, Rigby, ID (US)

(73) Assignee: Miles Willard Technologies, L.L.P., Idaho Falls, ID (US)

( * ) Notice: Subject to any disclaimer, the term of this patent is extended or adjusted under 35 U.S.C. 154(b) by 0 days.

(21) Appl. No.: 09/277,777

(22) Filed: Mar. 29, 1999

(51) Int. Cl.$^7$ ............................. A23L 1/216; A23L 1/2165
(52) U.S. Cl. ......................... 426/457; 426/476; 426/615; 426/639
(58) Field of Search .................................. 426/457, 615, 426/476, 639

(56) References Cited

U.S. PATENT DOCUMENTS

| | | | |
|---|---|---|---|
| Re. 31,982 | 9/1985 | Beck et al. | 426/550 |
| 2,870,020 | * 1/1959 | Ashley | 426/476 |
| 3,012,897 | * 12/1961 | Sullivan | 426/457 |
| 3,458,325 | 7/1969 | Beck | 99/207 |
| 3,574,643 | 4/1971 | Lewis | 99/207 |
| 3,622,355 | 11/1971 | Beck | 99/207 |
| 3,634,105 | 1/1972 | Beck et al. | 99/207 |
| 3,725,087 | 4/1973 | Miller et al. | 99/207 |
| 3,764,716 | 10/1973 | Rainwater et al. | 99/20 |
| 3,975,549 | 8/1976 | Shatila et al. | 426/550 |
| 3,987,207 | 10/1976 | Spaeti et al. | 426/99 |
| 3,991,222 | 11/1976 | Beck et al. | 426/550 |
| 4,005,139 | 1/1977 | Kortschot et al. | 426/550 |
| 4,107,345 | 8/1978 | MacDonald et al. | 426/637 |
| 4,241,094 | * 12/1980 | O'Neil et al. | 426/637 |
| 4,797,292 | 1/1989 | DeWitt | 426/285 |
| 4,800,090 | 1/1989 | August | 426/243 |
| 4,828,856 | 5/1989 | Willard | 426/272 |
| 4,946,704 | 8/1990 | DeWitt | 426/637 |
| 5,071,661 | 12/1991 | Stubbs et al. | 426/96 |
| 5,292,542 | 3/1994 | Beck et al. | 426/285 |
| 5,298,707 | 3/1994 | Sprecher et al. | 219/693 |
| 5,392,698 | 2/1995 | Sprecher et al. | 99/443 |
| 5,447,734 | * 9/1995 | Street | 426/637 |
| 5,707,671 | 1/1998 | Beck et al. | 426/242 |
| 5,718,935 | 2/1998 | Laufer | 426/243 |
| 5,750,165 | 5/1998 | Erway | 426/49 |
| 5,789,006 | 8/1998 | Jones et al. | 426/244 |

FOREIGN PATENT DOCUMENTS

| | | | |
|---|---|---|---|
| 1187762 | 4/1970 | (GB) | 426/637 X |
| 8202652 | 8/1982 | (WO) | 426/637 |
| 9800036 | 1/1998 | (WO) | A23L/1/2165 |

OTHER PUBLICATIONS

Boyle, Frank. *Potato Processing*, Dehydrated Mashed Potatoes—Potato Granules, pp. 443–462.

Boyle, Frank. *Potato Processing*, "Dehydrated Mashed Potatoes—Potato Flaking", pp. 470–506.

* cited by examiner

*Primary Examiner*—Helen Pratt
(74) *Attorney, Agent, or Firm*—Hopkins, Roden, Crockett, Hansen and Hoopes (57) ABSTRACT

A process and system for making dehydrated potato products with reduced water usage, and reduced waste water production, are provided. In a first process embodiment potato flakes are fabricated by washing, peeling and slicing raw potatoes to form potato pieces. The potato pieces are then precooked using steam or microwave energy, and vacuum cooled in a process chamber. The vacuum cooled potato pieces are then cooked using steam or microwave energy, and riced to form a potato mash. Following ricing, effluents from the precooking step can be added back to the mash as a flavor enhancer. In addition, the potato mash is dried using a drying apparatus such as a drum drier, to form potato sheets. The potato sheets are then comminuted to form potato flakes having a moisture content of about 6% to 8%. In a second process embodiment potato granules are fabricated by precooking washed, peeled and sliced potato pieces using steam or microwave, cooling the precooked potato slices, and then cooking the cooled potato slices using steam or microwave energy. The cooked potato slices are then conditioned, screened, mixed, partially dried, and finish dried to a moisture content of about 6% to 8%.

31 Claims, 8 Drawing Sheets

WATERLESS PROCESS AND SYSTEM FOR MAKING DEHYDRATED POTATO PRODUCTS

FIELD OF THE INVENTION

This invention relates to an improved process and system for making dehydrated potato products, that uses less water and produces less waste water than conventional processes.

BACKGROUND OF THE INVENTION

Potato flakes and potato granules are the most common types of dehydrated potato products. Potato flakes and potato granules comprise dehydrated single cells, or aggregates of cells, of the potato tuber dried to a moisture content of about 6%–8%. As the names imply, potato flakes have a crystal-like shape, while potato granules have a granular shape. Both potato flakes and potato granules can be rehydrated (i.e., reconstituted) to make mashed potato products and fabricated snack products.

Various processes for making potato flakes and potato granules, are well known in the art. An object of most prior art processes is to provide flakes or granules that can be rehydrated to make a potato product that has the flavor and texture of fresh cooked potatoes.

Figure 1:
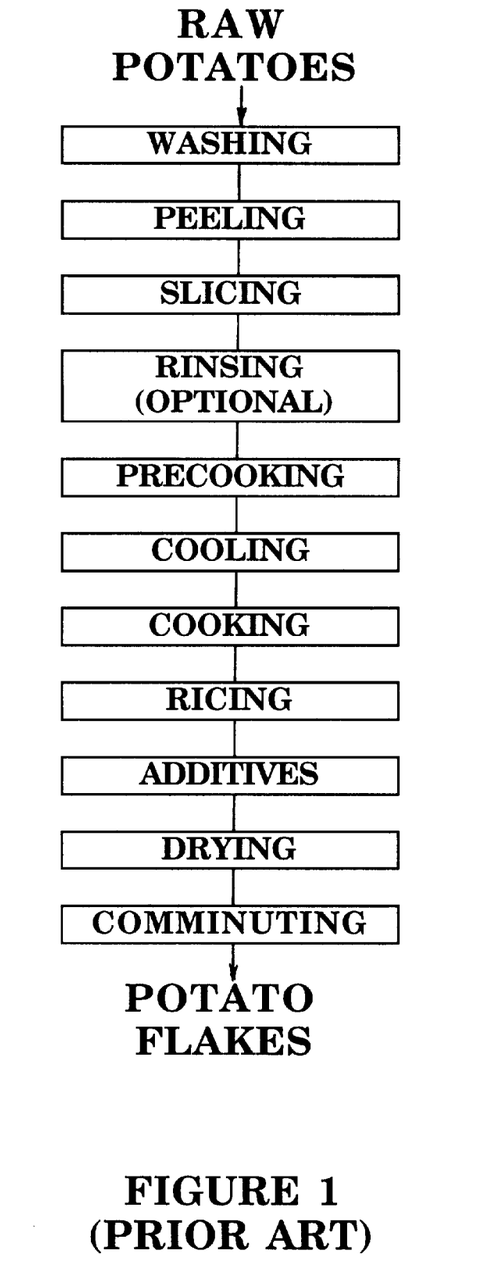
FIG. 1 is a flow diagram of process steps in a prior art process for making potato flakes.

FIG. 1 illustrates process steps in a conventional prior art process for making potato flakes. Initially, fresh potatoes are washed, peeled, sliced and optionally rinsed. The raw potato slices are then precooked, typically by immersion in water held at about 160° F.–165° F. (71.1° C.–73.9° C.) for a period of about 15–20 minutes. The precooking step gelatinizes starches within the potato cells, preferably with minimal swelling and bursting of the potato cells, such that retrogradation can take place during a subsequent cooling step. The bonds formed between the potato cells will thus be preserved during subsequent cooking and drying steps, and the reconstituted finished flake will have a reduced stickiness.

The cooling step is performed by immersing the precooked potato slices in water held at, or below, 75° F. (23.9° C.) for about 20–60 minutes. Following cooling, the potato slices are cooked, typically with steam, at a temperature of about 190° F.–212° F. (87.8° C.–100° C.) for about 15–60 minutes. One type of steam cooker includes a screw conveyor which moves the potato slices through a steam chamber containing live steam.

Following cooking, the cooked potato slices are riced to form a potato mash. Next, additives are added to the potato mash. Representative additives include solutions of sodium bisulfite for retarding non-enzymatic browning, and emulsions of a monoglyceride emulsifier, antioxidants and various chelating agents. Following the additive step, a drying step is performed on the potato mash, typically with a drum dryer. The drum drier dries the mash into a potato sheet having a moisture content of about 6%–8%. Following drying, the potato sheet can be comminuted into potato flakes using a comminuting apparatus such as a hammermill.

Figure 2:
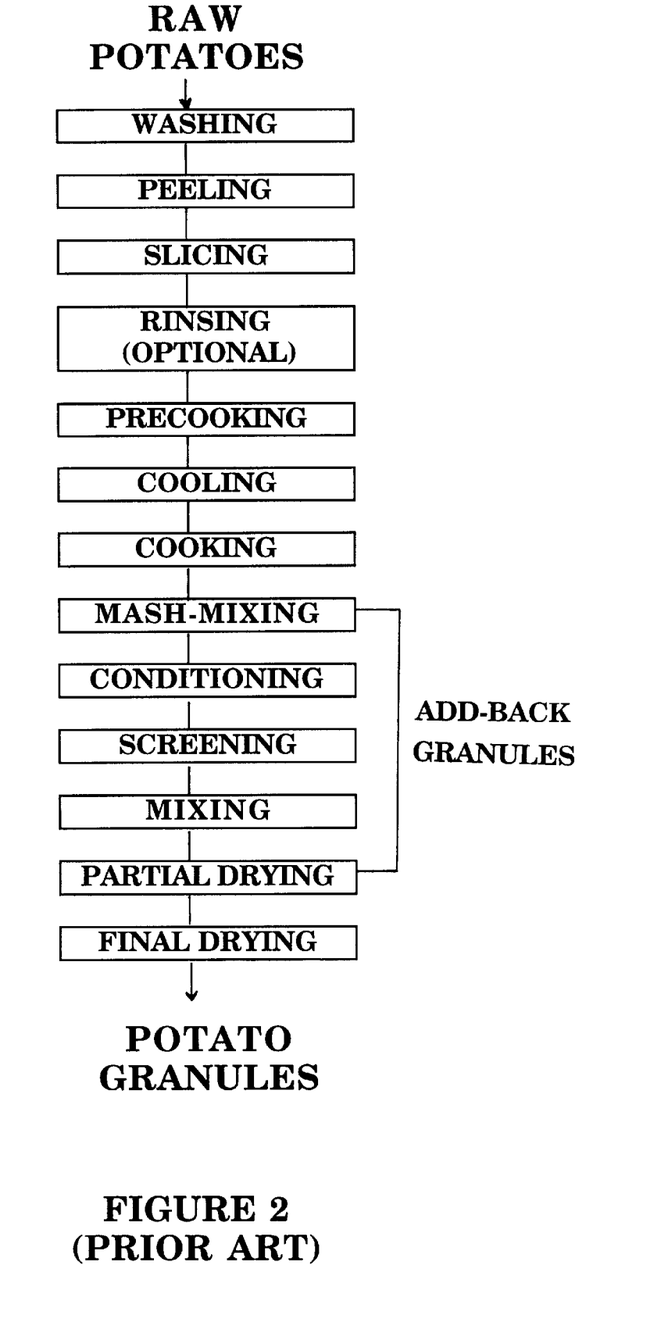
FIG. 2 is a flow diagram of process steps in a prior art process for making potato granules.

FIG. 2 illustrates process steps in a conventional prior art process for making potato granules. Initially raw potatoes are washed, peeled, sliced, precooked, cooled, cooked, riced and additives added substantially as previously described. During a mash mixing step hot cooked potatoes are mixed with dry add back granules until a homogeneous moist mix is obtained. Following mash mixing, a conditioning step equalizes the moisture throughout the mix, which is then passed over a fine mesh vibrating screen to remove large agglomerates and bruised portions of potato tissues. The product is then further mixed, and dried using a drying apparatus such as an air lift drier, or a fluidized bed drier. Following drying to a moisture content of about 12%–13%, a portion of the material is removed for add back, and the remainder is then finish dried to a moisture content of about 6%–8%, again by using a drying apparatus.

Both of the above described processes for making potato flakes and potato granules have been used in the art since about the 1950s. Over the years various processes have been proposed in which the above fabrication processes are modified. Representative processes are described in U.S. Pat. Nos. 5,707,671 and 5,292,542 to Beck et al.; U.S. Pat. No. 3,574,643 to Lewis; and U.S. Pat. No. 3,764,716 to Rainwater et al.

Most new fabrication processes are directed to improving the flavor and texture of the rehydrated potato product. The present invention is also directed to a process for making potato flakes and potato granules in which a primary object is improved flavor and texture in the rehydrated potato product.

However, another factor not generally considered by prior art fabrication processes is the large quantities of water that are required during various steps of the processes. As water resources come under increasing pressure, potato processors must compete with urban, agricultural, industrial and recreational interests for the available water rights. In addition, the water rights are expensive, which adds expense to the dehydrated potato products.

Besides requiring large quantities of water, prior art fabrication processes produce large quantities of waste water. Waste water is typically produced in all steps of the fabrication processes but drying. The precooking and cooling steps in particular, produce large quantities of waste water (e.g., up to 60% of the total waste water). The waste water from these steps also contains high concentrations of organic material.

Recently, potato processors have been experiencing difficulties in disposing of the large quantities of waste water produced by conventional potato fabrication processes. In the past, waste water has been disposed of by application to farmland at a rate approved by the Department of Environmental Quality. However, regulations and restrictions on the amount of waste water that can be applied to farmland have changed. Thus, it has become difficult, if not impossible, to dispose of the large quantities of waste water produced by potato fabrication processes.

Another problem with conventional disposal methods is that the waste water can contaminate ground water used for municipal and rural water supplies. Also, decomposing organic material in the waste water produces by-products, such as methane gas, that can affect air quality. The odor from decomposing waste water is a particular concern for processors located in close proximity to municipalities. In addition, the waste water can adversely affect crops by saturating the ground with too much water, particularly in wet years.

In view of the foregoing, the present invention is directed to a process and system for making dehydrated potato products in which water usage and waste water production are substantially reduced.

SUMMARY OF THE INVENTION

In accordance with the present invention, an improved process and system for making dehydrated potato products, such as potato flakes and potato granules, is provided.

In a first process embodiment the process is used to make potato flakes. The process includes the steps of washing, peeling, and slicing raw potatoes to form potato pieces. The potato pieces are then precooked by placing the raw potato pieces in a process chamber of a steam cooker-vacuum cooler. During the precooking step the potato pieces are held at a temperature of about 158° F.–165° F. (70° C.–73.9° C.) for a time period of about 15–20 minutes.

The steam precooking step minimizes damage to the potato cells, and leaching of flavor components from the potato cells. Also, any effluents from the precooking step can be collected from the process chamber, and added back, or retained in a subsequently formed mash. As an alternative to precooking with steam, the precooking step can be performed using microwave energy.

Following precooking, the slices are vacuum cooled. During the vacuum cooling step, the precooked potato slices are held at a temperature of about 75° F. (23.9° C.) or less, and a pressure of about −0.1 bar to −0.9 bar, for about 15–20 minutes or more. By using vacuum cooling, the cooling step can be controlled to retrograde starches and strengthen the potato cell walls, while minimizing leaching of flavor components from the potato cells by contact with water. For some applications vacuum cooling can be performed using the same process chamber as in the precooking step. Alternately, rather than vacuum cooling, the cooling step can be performed using a chiller or a cooler.

Following cooling, the slices are cooked using steam. Steam cooking can be performed using a steam cooker, or alternately in the same process chamber used in the precooking and cooling steps. Representative parameters during cooking include holding the potato pieces at a temperature of about 190° F. (87.8° C.) to 212° F. (100° C.) for about 20–60 minutes. As an alternative to steam cooking, the cooking step can be performed using microwave energy.

Following cooking, the cooked slices are riced to form a potato mash. Additives, such as emulsifiers, antioxidants, flavorings and color stabilizers, can then be added to the mash. In addition, effluents from the precooking step can be added back to the mash.

Next, the mash having a moisture content of about 80% is dried using a drum drier to form potato sheets having a moisture content of about 6%–8%. The potato sheets are then comminuted using a hammermill, or other suitable comminuting apparatus to form potato flakes. The above steps can be performed using a continuous process.

With the process of the invention, water usage and waste water production are substantially reduced. A significant reduction in water usage and waste water production results from performing the precooking step using steam or microwave energy, rather than hot water in liquid form, as in conventional processes. Additional reductions result from performing the cooling step using vacuum cooling, rather than cool water in liquid form, as in conventional processes.

The process of the invention also minimizes damage to the potato cells, and leaching of flavor and texture components from the potatoes by prolonged contact with water in liquid form as in conventional processes. Also, with steam precooking and vacuum cooling steps, effluents from the precooking step can be added back to the mash to improve flavor and texture in the finished product. The resultant potato flakes have a rehydrated potato flavor and texture that are comparable to, or superior to, potato flakes made using conventional processes.

In a second embodiment, potato granules rather than potato flakes are produced. The granule process can include washing, peeling, slicing, precooking, cooling, and cooking steps, performed substantially as previously described. Following the cooking step, mash mixing, conditioning, screening, mixing, partial drying and final drying steps can be performed as with a conventional granule fabrication process.

A system for performing the process includes conventional washing, peeling, and slicing apparatuses. The system also includes a steam cooker-vacuum cooler with a process chamber for precooking and cooling the potato slices, a steam cooker with a screw conveyor for cooking the potato slices, and a ricer for ricing the cooked slices to form a mash. In the first process embodiment (flakes) the system also includes a drying apparatus (e.g., drum dryer) for drying the mash to form sheets, and a comminuting apparatus (e.g., hammermill grinder) for comminuting the sheets into flakes. In the second process embodiment (granules), the system also includes a mash mixing apparatus, a conditioning apparatus (e.g., belt conditioner), a screening apparatus, a drying apparatus (e.g., air lift dryer), and a final drying apparatus (e.g., fluidized bed dryer). In either system embodiment the steam precooker-vacuum cooler, and/or the steam cooker, can be replaced by a microwave oven.

DETAILED DESCRIPTION OF THE PREFERRED EMBODIMENTS

Figure 3:
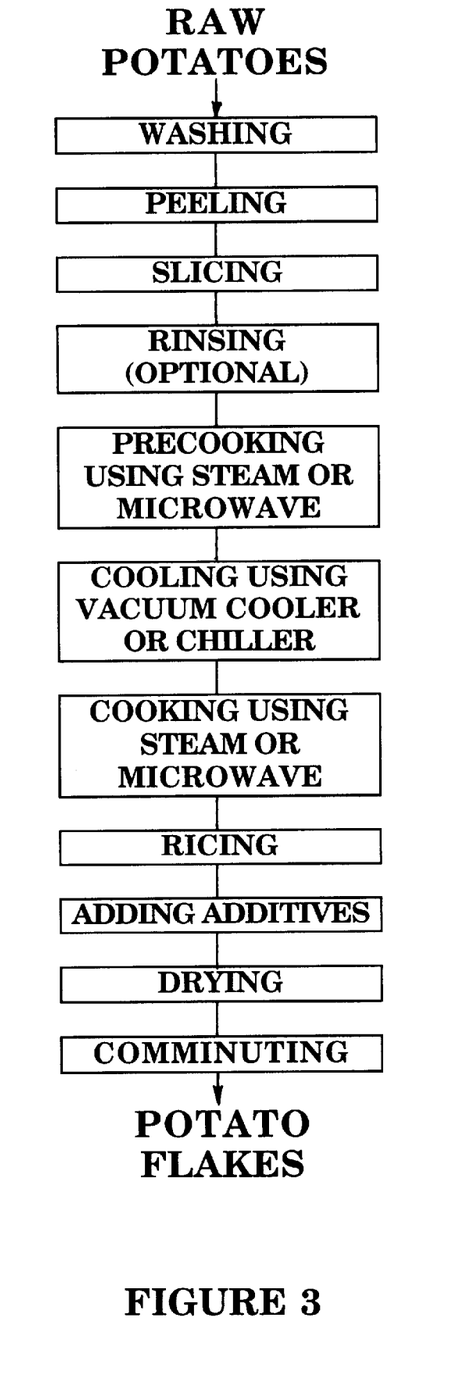
FIG. 3 is a flow diagram of process steps for making potato flakes in accordance with a first embodiment of the invention.
Figure 4A:
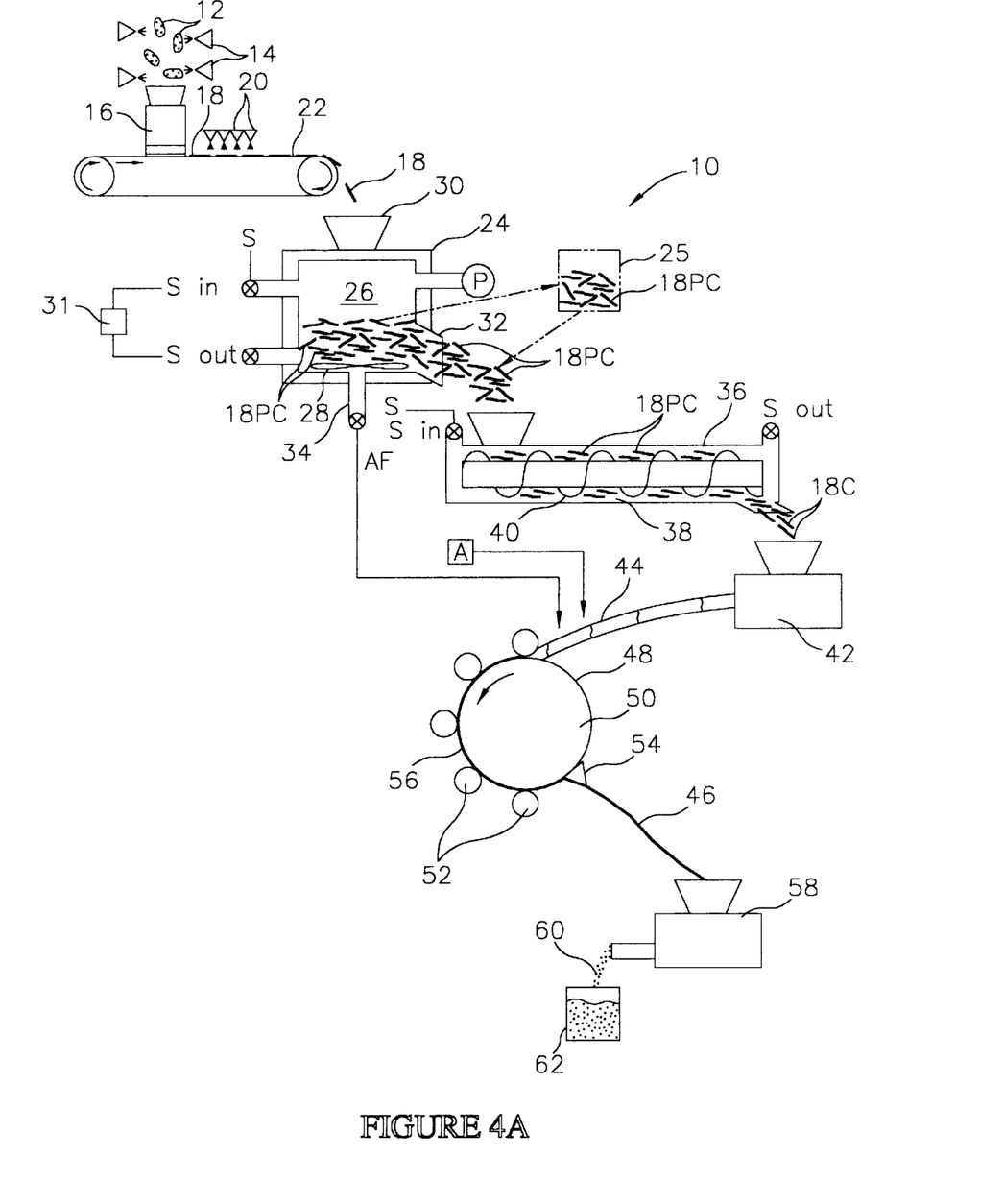
FIG. 4A is a schematic drawing of a system for performing the fabrication process of FIG. 3.

Referring to FIGS. 3 and 4A, a first process embodiment for making potato flakes in accordance with the invention is illustrated. FIG. 3 illustrates process steps. FIG. 4A illustrates a system 10 for performing the process of FIG. 3.

Initially, raw (uncooked) potatoes 12 are received from the field or storage and are sorted. Sorting may be accomplished using inspection tables (not shown) or other sorting mechanisms that are known in the art. In addition, the potatoes 12 can be washed and scrubbed using a scrubbing apparatus 14. Washing and scrubbing substantially removes adhered dirt and peels the potatoes 12. One suitable scrubbing apparatus is referred to as a "scrubber" and is manufactured by Van Mark of Iowa. Optionally, the potatoes can be steam peeled using a peeler, such as one manufactured by Odenburg of Germany.

Next, the washed and scrubbed potatoes 12 are fed into a slicing apparatus 16 to form potato slices 18. The slicing apparatus 16 can comprise a commercial vegetable slicing and dicing apparatus, such as one manufactured by Urschel Laboratories Inc. of Valparaiso, Ind. A representative thickness of the potato slices 18 can be from about 0.250 inches to 0.65 inches (0.634 cm–1.651 cm).

Following slicing, the potato slices 18 can be transferred to holding tanks for further processing and optionally rinsed, using a rinsing apparatus 20, to remove excess starch. In the illustrative system 10, the slicing apparatus 16 deposits a monolayer of raw potato slices 18 on an endless, moving, conveyor belt 22, and the slices 18 are rinsed as they move past the rinsing apparatus 20. However, as is apparent to those skilled in the art, other arrangements are possible.

Following the rinsing step, the potato slices 18 are loaded into a steam cooker-vacuum cooler apparatus 24. The steam cooker-vacuum cooler apparatus 24 performs the precooking step, and also the subsequent cooling step. One suitable steam cooker-vacuum cooler apparatus 24 is manufactured by Stephan u.Sohne GmbH & Company of Germany.

The steam cooker-vacuum cooler apparatus 24 includes a process chamber 26 wherein the potato slices 18 are loaded. In the illustrative system 10, loading and unloading of the potato slices 18 into the process chamber 26 is a batch process accomplished using techniques that are known in the art. For illustrative purposes the process chamber 26 is illustrated with an inlet 30 for receiving the potato slices 18 and an outlet 32 for discharging the partially cooked potato slices 18PC. However, in actual practice the potato slices 18, and precooked potato slices 18PC, may be received and discharged from the process chamber 26 using the same opening. Optionally, the precooking step may be a continuous process which employs screws, conveyors, or other mechanisms for moving the potato slices 18.

The process chamber 26 includes a steam inlet $S_{IN}$ in flow communication with a source of steam S at a desired temperature and pressure. The process chamber 26 also includes a steam outlet $S_{OUT}$ for exhausting spent steam. This arrangement permits live steam to be continuously injected into the process chamber 26 at a desired temperature and pressure, and spent steam to be continuously exhausted, to provide desired cooking parameters (e.g., temperature, pressure, time) within the process chamber 26, during the precooking step.

Using the steam cooker-vacuum cooler apparatus 24, the precooking step can be controlled to minimize damage to the potato cells, and to minimize leaching of flavor components from the potato cells by contact with water. Also water usage is substantially reduced as compared to conventional processes that employ hot water in liquid form to precook the potato slices. Similarly using the steam cooker-vacuum cooler apparatus 24, waste water from the precooking step is substantially eliminated.

A control panel 31, and associated controls (not shown), allow parameters within the process chamber 26, during the precooking step, to be monitored, and adjusted, as required. The process chamber 26 also includes a mixing baffle 28 for exposing different surfaces of the potato slices 18 to steam during the precooking step, and during a subsequent cooling step. In addition, the process chamber 26 includes an effluent exhaust conduit 34 for discharging effluents formed during the precooking and cooling steps. Optionally, if the precooking and cooking steps are performed in the same process chamber, the effluents can be retained in the process chamber 26.

During the precooking step, the potato slices 18 are heated to a temperature of about 158° F. to 165° F. (70° C.–73.9° C.) for about 15–20 minutes to form precooked potato slices 18PC. Also during the precooking step the process chamber 26 is maintained at about atmospheric pressure (i.e., 14.7 psig). These process parameters are sufficient to partially gelatinize the starch within the potato cells, but not break the intercellular bonds between the potato cells. One test for determining that the precooking step has been performed for a sufficient time period, is to break the potato slices 18PC and check for gelatinized starch strings in the middle portions thereof.

Following the precooking step, the effluents (EF) produced during the precooking step can be retained or removed from the process chamber 26 via the effluent exhaust conduit 34. These effluents (EF) can then be collected and added back to a subsequently formed mash 44 (FIG. 4A) as a flavor enhancer. As used herein the term "effluent" refers to a solution comprising water and various compounds found in potatoes (e.g., potato cells, potato starch, sugars, minerals). Some of these compounds are soluble, and some are present as particulate or solid materials within the solution.

Also following the precooking step, the potato slices 18PC are cooled to retrograde gelatinized starch in the potato cells. In the illustrative system 10, precooking and cooling can be performed using the process chamber 26 used for the precooking step. The cooling step can be accomplished by cooling the potato slices 18PC to a temperature of about 75° F. (23.9° C.) or less and holding for about 15 minutes or longer.

For performing the cooling step, the process chamber 26 can be sealed to atmosphere and placed in flow communication with a vacuum pump P. The pump P is configured to remove air and gases from the process chamber 26. Also during the cooling step a coolant, such as air at a temperature of about 36° F. to 40° F. (2.22° C.–4.44° C.), can be injected into the process chamber 26 and evacuated by the vacuum pump P. Cooling of the potato slices 18PC occurs as surface water from the potato slices 18PC transforms from the liquid phase to the vapor phase. Every pound of water removed from the potato slices 18PC, corresponds to approximately 540 BTUs of heat removed. During the cooling step, a vacuum within the process chamber 26 can be maintained within the range of from about −0.1 bar to −0.9 bar. The vacuum allows the transformation from the liquid to the vapor phase to occur more easily.

Using vacuum cooling, the cooling step can be controlled to retrograde starches, to strengthen the potato cell walls, and to minimize leaching of flavor components from the potato cells by contact with water. Further, water usage and waste water production during the cooling step are substantially eliminated. In comparison conventional cooling processes performed using water in liquid form, require significant quantities of water and produce significant quantities of waste water.

Rather than with vacuum cooling, the cooling step can be performed by convection using a cooling apparatus 25 such as a cooler, or a chiller. In FIG. 4A the cooling apparatus 25 is illustrated in phantom lines. In this case the precooked potato slices 18PC can be removed from the process chamber 26, placed in the cooling apparatus 25, and then cooled to a temperature of 75° F. (23.9° C.) or less and held for about 15 minutes or longer.

Following cooling, the precooked potato slices 18PC are cooked to form cooked potato slices 18C. The cooking step can be accomplished by heating the precooked potato slices 18PC to a temperature of about 190° F. to 212° F. (87.8° C. to 100° C.) for about 15–60 minutes.

For performing the cooking step, a steam cooker 36 can be employed. One suitable type of steam cooker 36 includes an unsealed steam chamber 38 having a screw conveyor 40. Live steam is injected into the steam chamber 38 as the screw conveyor 40 moves the precooked potato slices 18PC at a desired speed. The length of the steam chamber 38, and speed of the screw conveyor 40, determine the cooking time. Alternately, the cooking step can be performed using a pressurized sealed process chamber and steam, as previously described for the precooking step. If desired, the steam condensate can be retained with the cooked slices.

During the cooking step, process parameters can be adjusted as required, such that the cooked potato slices 18C are cooked to an appropriate degree. One factor affecting the cooking time is the potato solids content of the precooked potato slices 18PC. For monitoring the cooking process, samples can be evaluated using techniques that are known in the art.

Following cooking, the cooked potato slices 18C are riced to form a potato mash 44. This step is sometimes referred to as "mashing". The ricing step can be performed using a conventional ricing apparatus 42. One suitable ricing apparatus comprises a meat grinder attachment of a Hobart mixer having openings that are approximately 0.375 inches (0.95 cm) in diameter. A commercial masher having a stainless steel screw for forcing the cooked potato slices 18C through openings in a plate can also be employed to form the mash 44. A representative solids content of the mash 44 can be from about 18% to 22%. A representative moisture content of the mash can be from about 78% to 82%.

Following ricing, additives A can be added to the mash 44 using techniques that are known in the art, such as direct spraying of a liquid solution. Suitable additives include solutions of sodium bisulfite, and monoglyceride emulsifiers, antioxidants and chelating agents. In addition to the additives A, the effluent EF from the precooking step can be added back to the mash 44.

Following incorporation of the additives A, and effluent EF, the mash 44 can be dried to form a potato sheet 46 having a moisture content of about 6% to 8%. For performing the drying step, a drum drier 48 can be employed. The drum drier 48 includes a large diameter drum 50 heated with pressurized steam. The drum drier 48 also includes from four to six smaller diameter applicator rolls 52, whose surfaces rotate with a predetermined peripheral speed.

During operation of the drum drier 48, the mash 44 is fed at the top of the drum 50, and conveyed outward by a helical conveyor (not shown). As the mash 44 contacts the heated drum 50, a dried potato layer 56 forms on the drum 50. Each applicator roll 52 applies a layer of potato cells to the dried potato layer 56 passing below it, such that the finished potato sheet 46 has a thickness of from four to six layers. A reciprocating doctor knife 54 peels the dried potato layer 56 from the drum 50 to form the potato sheet 46.

The potato sheet 46 is then collected and transported from the drum drier 48 by a conveyor (not shown), or other suitable mechanism (e.g., trays). Parameters of the drying process including drum speed, steam pressure, and mash solids can be controlled to form the potato sheet 46 with the desired thickness and density. A representative thickness of the potato sheet 46 can be from about 0.002 inches (0.05 mm) to 0.015 inches (0.38 mm).

Following drying, the potato sheet 46 can be comminuted by a comminuting apparatus 58, such as a hammermill grinder, to form potato flakes 60.

Following the comminuting step, the potato flakes 60 can be packaged as required in a suitable container 62. Potato flakes 60 fabricated using the method illustrated in FIGS. 3 and 4A, are characterized by flavor and rehydrated texture comparable to that of flakes made using conventional methods which employ water in the precook and cool steps. In addition, water usage and waste water production are substantially reduced by the method of the invention. By way of example and not limitation, using the process of the invention waste water production can be reduced by as much as 60%.

Figure 4B:
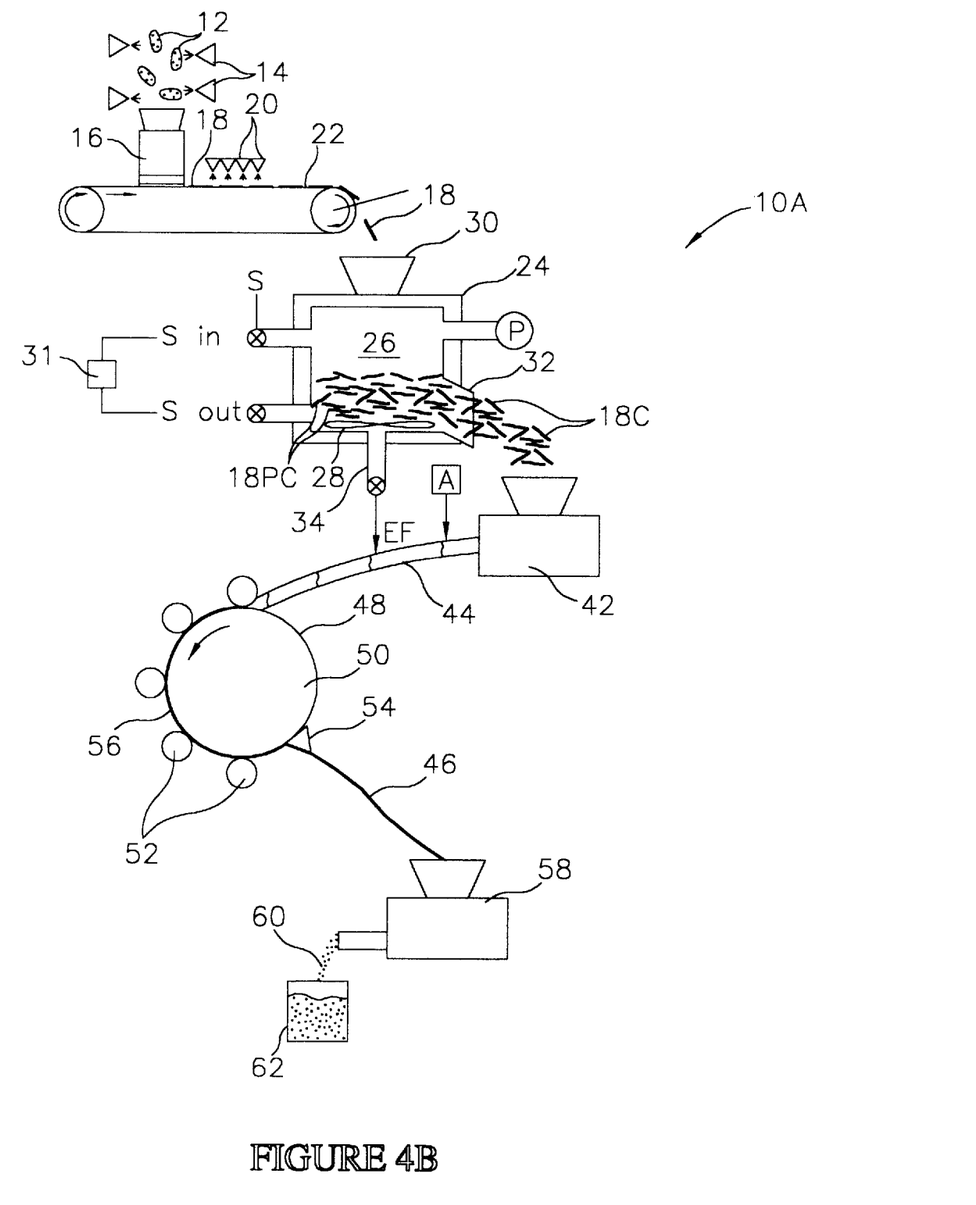
FIG. 4B is a schematic drawing of an alternate embodiment system for performing the fabrication process of FIG. 3 using a same process chamber for the precooking, cooling and cooking steps.

Referring to FIG. 4B, an alternate embodiment system 10A for performing the process of FIG. 3 is illustrated. The alternate embodiment system 10A is substantially similar to the system 10 (FIG. 4A) previously described. However, in the alternate embodiment system 10A the steam cooker 36 is eliminated, and the cooking step is performed in the same process chamber 26 as the precooking and cooling steps using the steam cooker-vacuum cooler apparatus 24. The process parameters maintained during the process are substantially the same as previously described for system 10.

Figure 4C:
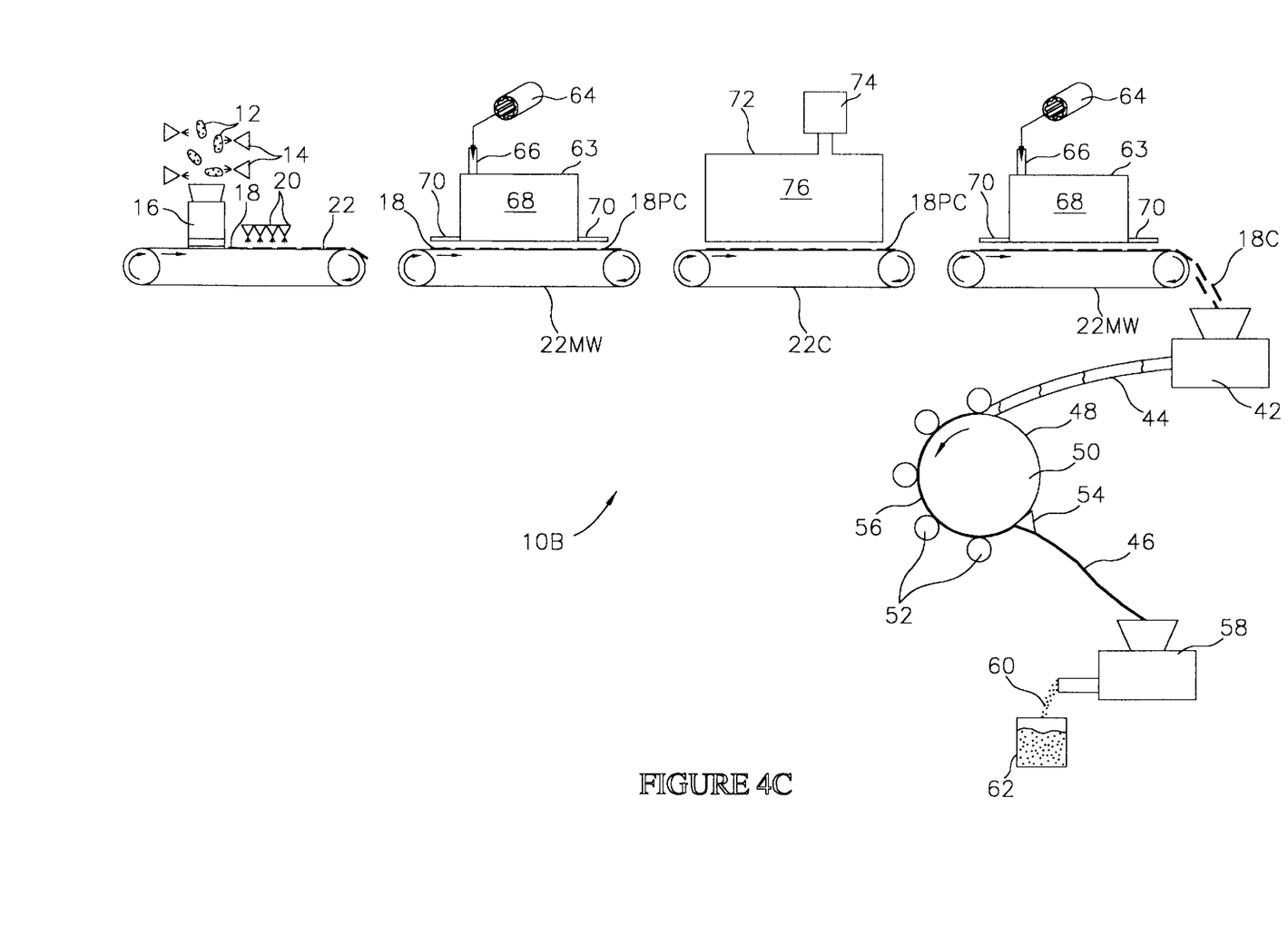
FIG. 4C is a schematic drawing of an alternate embodiment system for performing the fabrication process of FIG. 3 using a microwave process chamber for the precooking and cooking steps.

Referring to FIG. 4C, an alternate embodiment system 10B for performing the process of FIG. 3 is illustrated. In the alternate embodiment system 10B the precooking and cooking steps are performed using microwave energy. The system 10B includes a microwave oven 63 wherein the precooking step is performed.

A conveyor 22MW moves the potato slices 18 through the microwave oven 63 at a desired speed. However, it is to be understood that a batch process can also be performed. The microwave oven 63 includes a microwave source 64, such as a magnetron, configured to produce microwave energy. In addition, the microwave oven 63 includes a microwave chamber 68 having an inlet 66 for receiving and directing the microwave energy from the microwave source 64 onto the potato slices 18 moving through the microwave chamber 68. The microwave oven 63 also includes choke sections 70 for preventing microwaves from leaking out of the microwave chamber 68. Optionally the microwave chamber 68 can be in flow communication with a source of moisture (not shown) such that the atmosphere within the chamber 68 is humidified.

Microwave ovens are commercially available from various manufacturers such as Microdry Inc. of Crestwood, Ky. Typically, microwave ovens for home and commercial use are designed to operate at either 915 MHz or 2450 MHz and at a power of about 0.5 kilowatts to 1000 kilowatts.

The amount of power required to precook the potato slices 18 will depend on the quantity of potato slices 18 within the microwave chamber 68, and on the time that the potato slices remain in the microwave chamber 68. In general, the power and other parameters of the microwave precooking process can be selected to precook the potato slices 18 at a temperature of about 158° F. to 165° F. (70° C.–73.9° C.) for a time period of about 15–20 minutes or less.

Following the precooking step, the precooked potato slices 18PC discharge from the microwave oven 63 into a cooler 72. The cooler 72 includes a cooling chamber 76 in flow communication with a coolant supply 74 such as cooled air. In addition, the cooler 72 includes a conveyor 22C for moving the precooked potato slices 18PC through the cooling chamber 76. The cooling step can be performed at a temperature of 75° F. (23.9° C.), or less, for about 15 minutes or more.

Following the cooling step, the precooked potato slices 18PC are cooked. In the alternate embodiment system 10B the cooking step is performed using the microwave oven 63 previously described. In general, the power and other parameters of the microwave cooking process can be selected to cook the potato slices at a temperature of about 190° F. (87.8° C.), or greater, for about 20–60 minutes.

Following the cooking step, the cooked potato slices 18C are riced using ricing apparatus 42 to form a mash 44, substantially as previously described. In addition, the mash is dried using a drum drier apparatus 48. The resultant sheet 46 is then comminuted into flakes 60 using a comminuting apparatus 58, then packaged in a container 62 substantially as previously described.

Alternately the system 10B of FIG. 4C can be configured to combine a microwave precooking step with a steam cooking step. As another alternative, the system 10B of FIG. 4C can be configured to combine a steam precooking step with a microwave cooking step.

Figure 5:
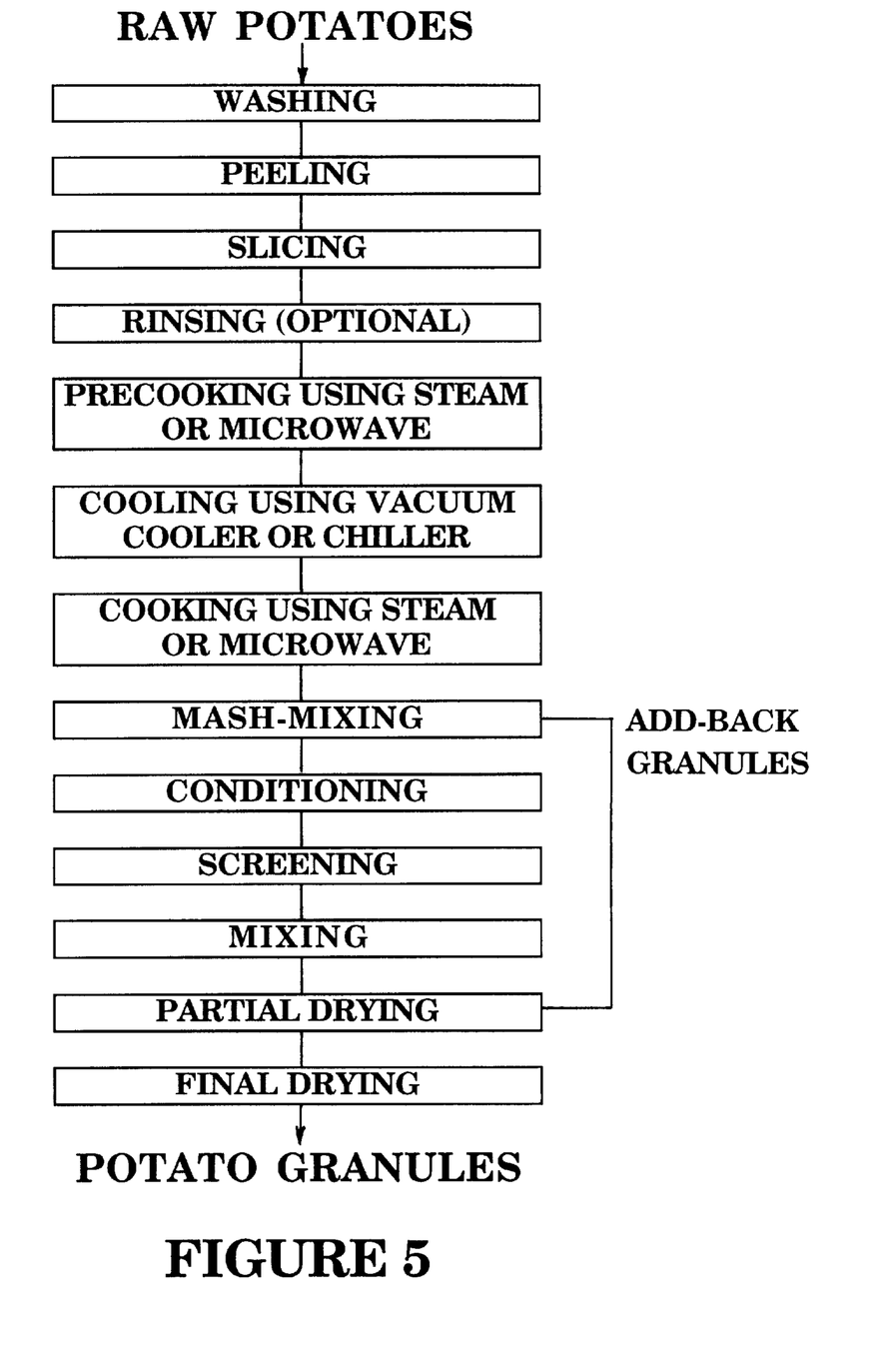
FIG. 5 is a flow diagram of process steps for making potato granules in accordance with a second embodiment of the invention.
Figure 6:
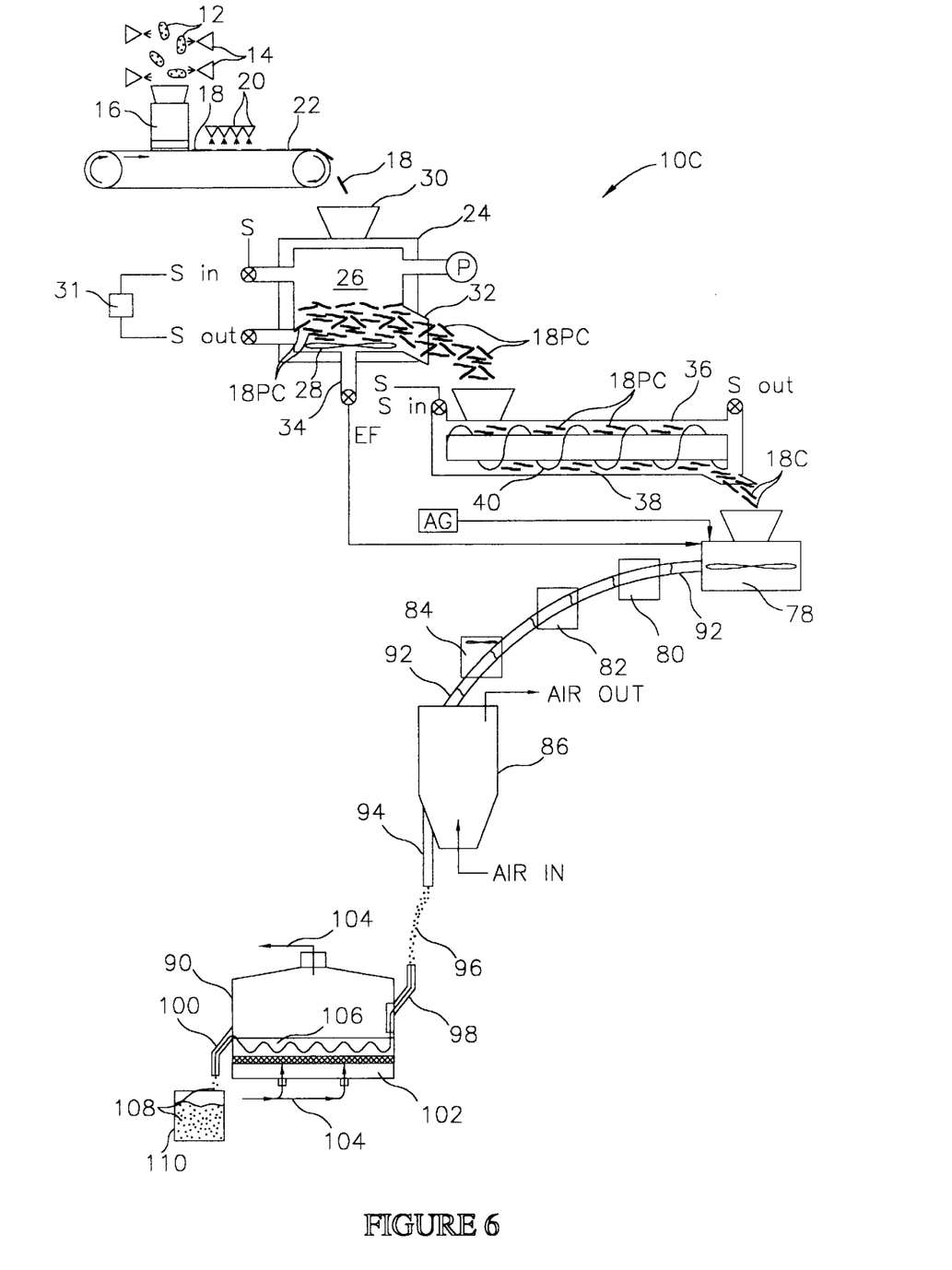
FIG. 6 is a schematic drawing of a system for performing the fabrication process of FIG. 5.

Referring to FIGS. 5 and 6, a second process embodiment for making potato granules in accordance with the invention is illustrated. FIG. 5 illustrates process steps. FIG. 6 illustrates a system 10C for performing the process of FIG. 5.

The granule fabrication process includes the steps of washing, peeling, slicing, rinsing, precooking, cooling, and cooking to form cooked potato slices 18C. These steps can be performed substantially as previously described.

For performing the above steps, the system 10C includes scrubbing apparatus 14, slicing apparatus 16, steam-precooker vacuum cooling apparatus 24, and steam cooker 36, all of which function as previously described in system 10 of FIG. 4A. Alternately the system 10C can be configured similarly to system 10A of FIG. 4B, with the precooking, cooling and cooking steps performed in the same process chamber. As another alternative, the system 10C can be configured similarly to system 10B of FIG. 4C with the precooking or cooking steps performed using microwave energy.

Still referring to FIG. 6, the cooked potato slices 18C are fed into a mash mixing apparatus 78. The mash mixing apparatus 78 is configured to mix the cooked potato slices 18C with dry add back granules AG until a homogeneous moist mash 92 is obtained. In addition, effluents EF from the precooking step can be added to the mash 92 during the mash mixing step.

Following mash mixing, a conditioning step can be performed on the mash 92 using a conditioning apparatus 80 which is configured to hold or "temper" the mash 92 at a desired temperature for a desired time period. Parameters can be controlled during the conditioning step to cool the mash 92 to a temperature of about 75° F. (23.9° C.) or less.

Following the conditioning step a screening step can be performed using a screening apparatus 82. Following screening, further mixing can be performed using a mixing apparatus 84.

The cooled, conditioned and mixed mash 92 is then fed into a drying apparatus 96 such as an air lift dryer wherein partial drying is performed. The drying apparatus 96 includes an outlet 94 wherein partially dried potato particles 96 having a moisture content of about 12%–13% are discharged. At this point add back granules can be removed from the partially dried potato particles 96 for add back to the mash as required.

Following partial drying, the partially dried potato particles 96 are fed into a drying apparatus 90 for final drying to a moisture content of about 6% to 8%. The drying apparatus 90 is illustrated as a fluidized bed dryer comprising an inlet 98, an outlet 100 and a plenum chamber 102 wherein hot air 104 is directed through a fluidized bed 106 of potato particles 96.

The potato granules 108 discharge from the outlet 100 of the drying apparatus 90 and can be packaged in a container 110. The potato granules 108 are characterized by flavor and rehydrated texture comparable to the standard process. In addition, water usage and waste water production are substantially reduced.

EXAMPLE 1

One hundred pounds of potatoes with solids ranging from 20.4% to 21% were used to manufacture Samples A, B and C. Samples B and C were divided into three batches of 33.3 pounds each for the precooking and cooling steps, then recombined for the cooking step.

TABLE 1

EXPERIMENTAL DESIGN

| PROCESS DESCRIPTION | A<br>Standard<br>Process | B<br>MWT<br>Process #1 | C<br>MWT<br>Process #2 |
|---|---|---|---|
| Precook | Water | Steam | Steam |
| Cool | Water | Vacuum | Vacuum |
| Precook/Cook Steam Condensate | Discharged | Discharged | Retained |
| Cook | Standard | Standard | Standard |
| Dry | Standard | Standard | Standard |

Potatoes were washed and peeled using a Hobart Abrasive Peeler, Model 6115. The potatoes were peeled for 30 seconds and rinsed with cold water. Slicing was performed using a Hallde slicer with a 15 mm blade. The slices were rinsed in cold water and processed as described below.

Potatoes for Sample A were processed using the industry standard of precooking and cooling with water and cooking with steam. Sliced potatoes were precooked in water at 160° F. for 20 minutes. The slices were transferred to a kettle containing circulating cold water until the internal slice temperature was less than 75° F. and held in cold water for an additional 15 minutes. Cooking was completed in a screw conveyor with multiple steam injection ports. The temperature inside the chamber was 204° F. with the slice temperature exiting the cooker at 195° F. The cooked potatoes were riced using a Hobart Meat Grinder Model 4146 with a head having ⅜" circular openings. An emulsifier solution containing 0.18 pounds of Myverol 18–06 and 0.67 pounds of 155° F. water was added to the potatoes during ricing. The riced potatoes were dried using a stainless steel drum dryer set at 27 seconds per rotation. The drum dryer was 3 feet wide and 2 feet in diameter with four applicator rolls. The applicator rolls were set with the following clearances from the drum.

| 1st (top) | roll . . . ⅛" |
|---|---|
| 2nd | roll . . . ¼" |
| 3rd | roll . . . ⅜" |
| 4th (bottom) | roll . . . ⅜" |

The mash was applied to the drum dryer applicator rolls and dried to a moisture of 6–8%. The dried sheet was ground using a Reitz Disintegrator Model RA1-4-K311 with knives to break up the flakes. Production data and product evaluations are found in Tables #2, 3 and 4.

Sample B was precooked and cooled using a Stephan Processor UM/HC44 Model 4988. Sliced potatoes were placed in the chamber and the rubber gasket from the lid was removed. A thermometer probe in the chamber was used to monitor the temperature. The chamber was tilted at a 90° angle and the lid left open approximately ½ inch to allow for drainage of the steam condensate. Steam was injected as needed to maintain a chamber temperature of 160° F. The mixing baffle was turned on during steam injection, or every thirty seconds, whichever was less. Slices were precooked at 160° F. for 20 minutes.

The rubber gasket in the lid was replaced and slices were vacuum cooled to below 75° F. and then held with jacket cooling for an additional 15 minutes. The cooking, drying and grinding were completed in the same manner as described for Sample A. Processing data and finished product evaluations are found in Tables 2, 3, and 4.

Sample C was processed the same as B except the condensate from the steam in the precook and cook steps was not drained, but was retained with the potatoes throughout processing. Tables 2, 3, and 4 show the processing data and finished product evaluations.

Testing Procedures

Potato flakes were evaluated by various physical, chemical and sensory tests to show effects of process conditions on product quality. Methods used for testing are described below.

Moisture (%)

Moisture analysis measures the amount of drying completed on the drum dryer. The analysis is done using a vacuum oven at 70 degrees C. for 16 hours. The target for standard flake is a moisture content between 6 and 8%. This provides product that is stable without scorching.

Broken Cell Count (%)

Broken cell count shows the damage to potato cells during processing. High levels of broken cells indicate that the product has been abused by not properly precooking cooling, cooking or grinding. These high levels result in product that has sticky texture and lacks the desired dry, mealy texture of fresh mashed potato. The broken cell count test is done by mixing 0.5 grams of dehydrated flakes with 20 ml of distilled water, allowing it to set for 30 minutes. One drop of the rehydrated solution is placed in the well of a microscope slide, a slip cover placed over it and the total number of cells and the number of broken cells are counted using a 100× light microscope. Cells are determined to be broken if the cell wall is discontinuous.

Water Absorption Index (WAI)

Water absorption index (WAI) is a measurement of the ability of the dehydrated potato flakes to absorb and hold water. The WAI is affected by the level of precooking, cooling, cooking and grinding. The test is done by mixing 2 grams of dehydrated potato flakes with 30 ml of distilled water and holding for 30 minutes in a 30 degree C. waterbath. The solution is centrifuged for 15 minutes at 3000 RPM and the supernatant immediately decanted off. The weight of the tube is subtracted from the weight of the tube plus rehydrated flake (without supernatant) divided by the weight of the dry sample [(wt. rehydrated sample−wt. of tube)/wt. of dry sample].

Thickness (mm)

Flake thickness is affected by the degree of cooking, additives, drum speed and applicator roll settings. Flake thickness is measured using a Starrett Gauge. Ten measurements are taken on random flakes and averaged.

Amylose (%)

The percentage of amylose is an indicator of the level of free starch or amount of damage to the potato cells during processing. The higher the level, the greater the cell damage. Amylose level is affected by precooking, cooling, cooking and grinding. The test is done by mixing a sample of flakes and 0.1 N sodium hydroxide. The mixture is set in a 65 degree C. water bath with occasional stirring for 30 minutes then filtered through Whatman #4 filter paper. One ml of the solution is transferred to a 25 ml volumetric flask and the volume made up with iodine solution. The absorbance is read at 700 nm on a spectrophotometer and the percentage of amylose calculated using a standard curve.

Particle Size Distribution (%)

Particle size distribution is determined by using US Standard Screens. One hundred grams of flakes are placed on the top screen and the screens are shaken for 5 minutes using a Tyler Ro-Tap Shaker. The amount of flakes remaining on each screen is measured and reported as percent. The screen distribution affects the texture of the rehydrated product, amylose level, WAI and broken cell count. The particle size distribution is controlled by the type of grinding and screening equipment used during manufacturing. It can also be impacted by methods of flake transfer such as augers and air lifts.

Sensory Evaluation

Potato flakes are often rehydrated for use as mashed potatoes. The rehydrated product should have characteristics similar to that of the fresh potatoes and are evaluated for aroma, appearance, flavor and texture using trained panelists. The flakes are rehydrated using 95 grams of flakes added to 472 ml of 175 degree F. water and mixed on low speed using a Kitchen Aid mixer with the paddle attachment for 20 seconds.

Table 4 shows results of sensory evaluation conducted on the samples.

The evaluation process used a rating system for specific characteristics as described below. Each of four panelists evaluated and rated each product and the reported results are an average of these ratings.

A. Aroma: Intensity of the product aroma: 0—no aroma; 9=intense aroma

B. Appearance: Intensity of each color; 0—no color; 9=intense color.

Translucency; 0=very dry; 9=very watery.

C. Flavor: Intensity of overall flavor; 0=no flavor; 9=intense flavor.

D. Texture: Seven point texture grading system of overall texture as follows:

1. Light and fluffy, similar to fresh potatoes in all respects.
2. Very mealy, light and crumbly; breaks evenly.
3. Mealy but more moist, not sticky, breaks evenly.
4. Noticeably more moist and/or heavy, but not sticky.
5. More moist and/or heavy, will not break easily but pulls out; has lost light, fluffy, crumbly character.
6. Noticeably watery, heavy or sticky—will not break; rejected for commercial use.
7. Very pasty, rubbery or watery; considerably worse than borderline rejection.

Results:

1. Potatoes can be processed with the waterless process using the same times and temperatures as used in the standard dehydrated potato flake process.
2. Laboratory evaluations show that potato flakes produced by all three processes are very similar with small differences in the final moisture, broken cell count, WAI, sheet thickness, amylose level and particle size.
3. Sensory evaluations indicate very slight differences between the samples. The only attribute with greater than a 0.5 unit difference between samples was Sample B which had more gray color. It is important to note that no additives, such as sodium acid pyrophosphate, citric acid or sodium bisulfite, were applied to these flakes to minimize discoloration.

TABLE 2

PRODUCTION DATA

| PROCESS DESCRIPTION | A Standard Process | B MWT Process #1 | C MWT Process #2 |
|---|---|---|---|
| Potato Solids (%) | 20.4 | 21.0 | 20.6 |
| Precook Temperature (° F.) | 160 | 160 | 160 |
| Precook Time (min) | 20 | 20 | 20 |
| Slice Temperature After Precook (° F.) | 159 | 159 | 162 |
| Time With Vacuum Cool (Min) | N/A | 7 | 8 |
| Slice Temperature After Vacuum Cool (° F.) | N/A | 70 | 73 |
| Time Held Below 75° F. (Min) | 15 | 15–60 | 15–60 |
| Slice Temperature After Hold (° F.) | 60 | 65 | 60 |
| Cook Temperature (° F.) | 203 | 204 | 203 |
| Cook Time (Min) | 20 | 21:25 | 19:45 |
| Slice Temperature After Cooking (° F.) | 195 | | 197 |

TABLE 3

LABORATORY EVALUATIONS

| PROCESS DESCRIPTION | A Standard | B MWT Process #1 | C MWT Process #2 |
|---|---|---|---|
| Laboratory Test | | | |
| Moisture (%) | 8.5 | 7.1 | 8.9 |
| Broken Cell Count (%) | 15 | 14 | 15 |
| WAI | 9.54 | 9.57 | 8.86 |
| Amylose (%) | 13.5 | 8.8 | 11.8 |
| Thickness (mm) | 0.28 | 0.28 | 0.22 |
| Particle Size Analysis | | | |
| +10(%) | 61.0 | 37.6 | 58.0 |
| +20(%) | 25.1 | 33.1 | 24.0 |
| +40(%) | 9.3 | 18.3 | 7.5 |
| +60(%) | 2.5 | 6.3 | 9.3 |
| +80(%) | 0.8 | 2.0 | 0.5 |
| −80(%) | 1.0 | 2.8 | 0.7 |

TABLE 4

SENSORY EVALUATIONS

| PROCESS DESCRIPTION | A Standard | B MWT Process #1 | C MWT Process #2 |
|---|---|---|---|
| Aroma Intensity (0 = None, 9 = Extreme) | 3.4 | 3.8 | 3.6 |
| Appearance (0 - None, 9 = Extreme) | | | |
| Creamy color | 3.4 | 3.4 | 3.6 |
| White color | 2.4 | 2.4 | 2.4 |
| Yellow color | 2.6 | 2.6 | 2.9 |
| Grayish color | 0.9 | 1.0 | 0.9 |

TABLE 4-continued

SENSORY EVALUATIONS

| PROCESS DESCRIPTION | A Standard | B MWT Process #1 | C MWT Process #2 |
|---|---|---|---|
| Greenish color | 0.3 | 0.5 | 0.5 |
| Watery color | 0.3 | 0.3 | 0.3 |
| Texture | 2.8 | 2.8 | 2.8 |
| Overall rating (1 = fluffy; 5 = sticky) | | | |
| Flavor (0 = none, 9 = extreme) | | | |
| Intensity | 4.3 | 4.9 | 5.0 |
| Salt | 2.8 | 3.3 | 3.6 |
| Sweet | 2.8 | 2.5 | 3.0 |
| Creamy | 3.4 | 3.3 | 3.6 |
| Buttery | 3.3 | 3.3 | 3.5 |
| Earthy | 3.3 | 2.8 | 2.8 |
| Bitter | 1.5 | 2.0 | 1.6 |
| Sour | 1.1 | 1.5 | 1.9 |
| Metallic | 0.5 | 0.5 | 0.5 |
| Stale | 0.3 | 0.3 | 1.0 |
| Overall Quality | Good | Good | Good+ |

EXAMPLE 2

Table 5 summarizes the variables tested. Table 6 shows production data. Laboratory and sensory evaluations were conducted on each sample with data shown in Tables 7 and 8.

Thirty-three pounds of potatoes were prepared for processing in the same manner as described in Example 1.

Sample A was precooked and cooled using the Stephan Processor as described for Example 1, Sample B. Sample A was cooked by placing the slices into the preheated steam cooking chamber, closing the lid and allowing steam to vent through the funnel valve. The chamber temperature was maintained at 190° F. using steam injection. Slices were cooked for 20 minutes. Baffle was turned on to mix potatoes.

Sample B slices were precooked and cooled using the conventional water process described in Example 1, Sample A. Cooking was done using the Stephan as in Example 2, Sample C.

Sample C was precooked and cooled using the Stephan Processor as described for Sample B, Example 1, and cooked using a steam cabinet with the potato slices placed in a single layer on trays in the cabinet. Steam valves were opened ½ turn with an approximate chamber temperature of 204° F. and the slices were cooked for 15 minutes.

Cooked slices for all variables were riced using a Hobart Meat Grinder with a head having ⅜" round openings. Myverol 18–06 was added during ricing. The riced potatoes were dried to a moisture content of 6–8% using a double drum dryer.

Results:
1. Laboratory and sensory evaluation show that the flakes produced with the waterless process are equivalent to, or possess characteristics that make it a preferred flake, to those processed using the industry standard of water for the precook and cool.
2. The waterless process produces flakes which have lower viscosity, Water Absorption Index (WAI) and broken cell counts.
3. Sensory evaluations show the aroma and flavor to be more intense with the waterless precook/cool process. Sample B was whiter, less yellow and less brown than the other samples. The textures for all samples were similar with the standard process sample being slightly less mealy. Flavors were similar in all categories with a higher overall intensity for Samples A and C. The samples made with the waterless precook/cool had less sour, and off flavors than product made with water.

4. Overall quality of the product was higher for the waterless precook and cool samples than the standard sample.

TABLE 5

EXPERIMENTAL DESIGN

| PROCESS DESCRIPTION | A MWT Process | B Standard | C MWT Process |
|---|---|---|---|
| Precook Process | Steam | Water | Steam |
| Cool Process | Vacuum | Water | Vacuum |
| Cooking Chamber | Stephan | Stephan | Steam Cabinet |
| Dryer | Double Drum | Double Drum | Double Drum |

TABLE 6

PRODUCTION DATA

| PROCESS DESCRIPTION | A MWT Process | B Standard | C MWT Process |
|---|---|---|---|
| Raw solids (%) | 21.2 | 21.2 | 21.1 |
| Slab thickness (inches) | 0.63 | 0.63 | 0.63 |
| Precook temperature (° F.) | 160 | 160 | 160 |
| Slab temperature after precook (° F.) | 158 | NT | 158 |
| Precook time @ 160° F. (minutes) | 20 | 20 | 20 |
| Vacuum cool (minutes) | 5 | NA | 5 |
| Internal temperature after vacuum cool (° F.) | 75 | NA | 74 |
| Cook temperature (° F.) | 190 | 190 | 204 |
| Cook time (minutes) | 20 | 20 | 15 |

TABLE 7

LABORATORY EVALUATIONS

| PROCESS DESCRIPTION | A MWT Process | B Standard | C MWT Process |
|---|---|---|---|
| Moisture (%) | 5.2 | 5.0 | 6.9 |
| Hot paste viscosity (BU) | 10 | 40 | 20 |
| Cold paste viscosity (BU) | 20 | 55 | 35 |
| Broken cell counts (%) | 26 | 37 | 14 |
| WAI | 8.7 | 9.5 | 9.4 |
| Amylose (%) | 2.7 | 2.6 | 3.6 |

TABLE 8

SENSORY EVALUATION

| PROCESS DESCRIPTION | A Waterless Process | B Standard | C Waterless Process |
|---|---|---|---|
| Aroma intensity | 4.4 | 3.6 | 4.0 |
| Appearance | | | |
| Creamy color | 3.6 | 3.6 | 3.9 |
| White color | 1.5 | 2.9 | 1.6 |
| Yellow color | 2.0 | 1.4 | 2.1 |
| Grayish color | 1.8 | 2.0 | 1.3 |
| Greenish color | 0.6 | 0.4 | 0.6 |

TABLE 8-continued

SENSORY EVALUATION

| PROCESS DESCRIPTION | A Waterless Process | B Standard | C Waterless Process |
|---|---|---|---|
| Brownish color | 2.8 | 1.4 | 2.0 |
| Watery | 1.3 | 1.3 | 1.5 |
| Texture: Overall rating | 2.2 | 2.7 | 2.5 |
| Flavor | | | |
| Intensity | 5.0 | 4.8 | 5.5 |
| Salt | 0.6 | 0.6 | 0.6 |
| Sweet | 1.0 | 0.8 | 1.1 |
| Creamy | 0.3 | 0.5 | 0.6 |
| Buttery | 0.3 | 0.3 | 0.5 |
| Earthy | 4.9 | 4.4 | 4.5 |
| Bitter | 3.0 | 3.1 | 3.1 |
| Sour | 1.8 | 2.0 | 1.5 |
| Metallic | 2.0 | 1.9 | 2.0 |
| Stale | 0 | 0 | 0 |
| Off flavor | 0 | 1.3 | 0 |
| Overall Quality | Fair | Fair– | Fair |

Thus the invention provides an improved process for making dehydrated potato products that substantially reduces water usage and the production of waste water by employing steam or microwave energy in the precooking and cooking steps. The process also employs vacuum cooling, rather than water cooling, to further reduce water usage, waste water production, and leaching of flavor components. The resultant potato products are characterized by a texture and flavor similar to that of potato products made using conventional processes.

Although the invention has been described with reference to certain preferred embodiments, as will be apparent to those skilled in the art, certain changes and modifications can be made without departing from the scope of the invention, as defined by the following claims.

What is claimed is:

1. A process for making a dehydrated potato product comprising:

washing, peeling and slicing potatoes to form potato slices;

precooking the slices using steam to a first temperature and for a first time period sufficient to form gelatinized starch strings in the slices;

following precooking, vacuum cooling the slices to a second temperature and for a second time period sufficient to retrograde the starch strings;

following cooling, cooking the slices using steam or microwave energy;

following cooking, ricing the slices to form a mash;

drying the mash to form a sheet; and comminuting the sheet into flakes.

2. The process of claim 1 further comprising collecting an effluent during the precooking step and adding the effluent to the mash.

3. The process of claim 1 wherein the precooking step and the cooling step are performed using a steam cooker-vacuum cooling apparatus.

4. The process of claim 1 wherein the cooling step and the precooking step are performed in a process chamber.

5. A process for making a dehydrated potato product comprising:

washing, peeling and slicing potatoes to form potato slices;

precooking the slices using steam;
following precooking, vacuum cooling the slices;
following vacuum cooling, cooking the slices;
following cooking, forming the potato slices into a mash;
adding an effluent from the precooking step to the mash;
drying the mash to form a sheet; and
comminuting the sheet into flakes.

6. The process of claim 5 further comprising providing a steam cooker-vacuum cooler apparatus and performing the precooking step and the vacuum cooling step in said apparatus.

7. The process of claim 5 further comprising providing a process chamber configured to precook and cool the slices and performing the precooking step and the vacuum cooling step in the process chamber.

8. The process of claim 5 further comprising providing a process chamber configured to precook, cool and cook the slices and performing the precooking step, the vacuum cooling step, and the cooking step in the process chamber.

9. The process of claim 5 further comprising providing a process chamber and performing the precooking step and the cooking step in the process chamber while retaining the effluent from the precooking step in the process chamber.

10. The process of claim 5 wherein the cooking step is performed using steam or microwave energy.

11. A process for making a dehydrated potato product comprising:
washing, peeling and slicing potatoes to form potato slices;
providing a process chamber in flow communication with a source of steam and a vacuum pump;
precooking the slices in the chamber using steam to a first temperature of at least about 158° F. for at least about 15 minutes;
following precooking, cooling the slices in the chamber while maintaining a vacuum in the chamber to a second temperature of about 75° F. or less;
following cooling, cooking the slices to a third temperature of at least about 190° F. for at least about 15 minutes;
following cooking, ricing the slices to form a mash;
drying the mash to form a sheet; and
comminuting the sheet into potato flakes.

12. A process for making a dehydrated potato product comprising:
washing, peeling and slicing potatoes to form potato slices;
providing a process chamber in flow communication with a source of steam and a vacuum pump;
precooking the slices in the chamber using steam;
following precooking, cooling the slices in the chamber while maintaining a vacuum in the chamber;
following cooling, cooking the slices;
following cooking, ricing the slices to form a mash;
collecting an effluent during the precooking step and adding the effluent to the mash;
drying the mash to form a sheet; and
comminuting the sheet into potato flakes.

13. The process of claim 12 further comprising retaining the effluent in the chamber during the precooking step and the cooling step and then performing the cooking step in the process chamber using steam.

14. A process for making a dehydrated potato product comprising:

washing, peeling and slicing potatoes to form potato slices;
precooking the slices in a process chamber;
following precooking, cooling the slices in the process chamber;
collecting an effluent produced during the precooking step from the process chamber;
following cooling, cooking the slices;
following cooking, ricing the slices to form a mash;
adding the effluent to the mash;
drying the mash to form a sheet; and
comminuting the sheet into potato flakes.

15. The process of claim 14 wherein the precooking step and the cooking step are performed in a same process chamber using steam.

16. The process of claim 14 further comprising providing a steam cooker-vacuum cooler apparatus and performing the precooking and cooling steps using the apparatus.

17. The process of claim 14 wherein collecting the effluent comprises retaining the effluent in the process chamber and then performing the cooking step in the process chamber.

18. The process of claim 14 wherein the steps are performed continuously.

19. A process for making a dehydrated potato product comprising:
washing, peeling and slicing potatoes to form potato slices;
precooking the slices using steam;
collecting an effluent from the precooking step;
following precooking, vacuum cooling the slices;
following vacuum cooling, cooking the slices using steam;
following cooking, forming the potato slices into a mash;
adding the effluent to the mash; and
conditioning and drying the mash to form potato granules.

20. The process of claim 19 wherein the precooking step, the cooling step and the cooking step are performed in a process chamber.

21. The process of claim 19 wherein the precooking step and the cooling step are performed using a steam cooker-vacuum cooler apparatus.

22. The process of claim 19 wherein the precooking, collecting, cooling, cooking and adding steps are performed in a process chamber.

23. A process for making a dehydrated potato product comprising:
washing, peeling and slicing potatoes to form potato slices;
providing a steam cooker-vacuum cooler apparatus;
precooking the slices using the steam cooker-vacuum cooling apparatus to a first temperature and for a first time period sufficient to form gelatinized starch strings in the slices;
following precooking, vacuum cooling the slices using the steam cooker-vacuum cooling apparatus to a second temperature and for a second time period sufficient to retrodgrade the starch strings;
following cooling, cooking the slices;
following cooking, ricing the slices to form a mash;
drying the mash to form a sheet; and
comminuting the sheet into flakes.

24. A process for making a dehydrated potato product comprising:

washing, peeling and slicing potatoes to form potato slices;

providing a steam cooker-vacuum cooler apparatus;

precooking the slices using the steam cooker-vacuum cooling apparatus;

collecting an effluent from the precooking step; following precooking, vacuum cooling the slices using the steam cooker-vacuum cooling apparatus;

following cooling, cooking the slices;

following cooking, ricing the slices to form a mash;

adding the effluent to the mash;

drying the mash to form a sheet; and comminuting the sheet into flakes.

25. The process of claim 24 wherein the cooking step is performed using the steam cooker-vacuum cooler apparatus.

26. A process for making a dehydrated potato product comprising:

washing, peeling and slicing potatoes to form potato slices;

precooking the slices using microwave energy to a first temperature of at least about 158° F. for at least about 15 minutes;

following precooking, vacuum cooling the slices to a second temperature of about 75° F. or less;

following cooling, cooking the slices to a third temperature of at least about 190° F. for at least about 15 minutes;

following cooking, forming the potato slices into a mash; and drying the mash.

27. The process of claim 26 wherein the cooling step comprises vacuum cooling for at least about 15 minutes.

28. The process of claim 26 wherein the cooking step comprises micro waving the slices.

29. A process for making a dehydrated potato product comprising:

washing, peeling and slicing potatoes to form potato slices;

precooking the slices using microwave energy to a first temperature and for a first time period sufficient to form gelatinized starch strings in the slices;

following precooking, vacuum cooling the slices to a second temperature and for a second time period sufficient to retrodgrade the starch strings;

following cooling, cooking the slices using microwave energy;

following cooking, mixing the slices with add back granules to form a mash;

conditioning and drying the mash to form potato granules.

30. A process for making a dehydrated potato product comprising:

washing, peeling and slicing potatoes to form potato slices;

precooking the slices using microwave energy;

collecting an effluent during the precooking step;

following precooking, cooling the slices;

following cooling, cooking the slices using microwave energy;

following cooking, mixing the slices with add back granules to form a mash;

adding the effluent to the mash; and conditioning and drying the mash to form potato granules.

31. A process for making a dehydrated potato product comprising:

washing, peeling and slicing potatoes to form potato slices;

precooking the slices using microwave energy;

collecting an effluent from the precooking step;

following precooking, vacuum cooling the slices;

following cooling, cooking the slices using microwave energy;

following cooking, forming the potato slices into a mash;

adding the effluent to the mash; and drying the mash.

* * * * *

UNITED STATES PATENT AND TRADEMARK OFFICE
CERTIFICATE OF CORRECTION

PATENT NO. : 6,197,358 B1  Page 1 of 1
DATED : March 6, 2001
INVENTOR(S) : LaRue Bunker, Kyle E. Dayley It is certified that error appears in the above-identified patent and that said Letters Patent is hereby corrected as shown below:

Title page,
Item [12], change "Bunker" to -- Bunker et al. --

Item [75],
After "(US)" add -- Kyle E. Dayley, Rigby, ID (US) --

Signed and Sealed this

Sixth Day of November, 2001

*Attest:*

*Attesting Officer*

NICHOLAS P. GODICI
*Acting Director of the United States Patent and Trademark Office*